(12) United States Patent
Nielsen et al.

(10) Patent No.: US 10,113,290 B2
(45) Date of Patent: Oct. 30, 2018

(54) METHOD OF INSTALLING A FOUNDATION IN THE SEA BED AND SUCH FOUNDATION

(71) Applicant: UNIVERSAL FOUNDATION A/S, Aalborg (DK)

(72) Inventors: Soren Andreas Nielsen, Fjerritslev (DK); Lars Bo Ibsen, Aalborg (DK)

(73) Assignee: UNIVERSAL FOUNDATION A/S, Aalborg Ost (DK)

( * ) Notice: Subject to any disclaimer, the term of this patent is extended or adjusted under 35 U.S.C. 154(b) by 0 days.

(21) Appl. No.: 14/376,164

(22) PCT Filed: Feb. 8, 2013

(86) PCT No.: PCT/DK2013/050034
§ 371 (c)(1),
(2) Date: Aug. 1, 2014

(87) PCT Pub. No.: WO2013/117197
PCT Pub. Date: Aug. 15, 2013

(65) Prior Publication Data
US 2015/0010365 A1   Jan. 8, 2015

(30) Foreign Application Priority Data

Feb. 10, 2012 (DK) ................................ 2012 70068

(51) Int. Cl.
*E02B 17/02* (2006.01)
*E02D 27/52* (2006.01)
(Continued)

(52) U.S. Cl.
CPC ............ *E02D 27/525* (2013.01); *B63B 21/27* (2013.01); *E02D 23/00* (2013.01); *E02D 27/10* (2013.01);
(Continued)

(58) Field of Classification Search
CPC ............ E02D 2250/0053; E02D 27/52; E02D 27/525; E02B 2017/0078; B63B 21/27; B63B 2021/267
(Continued)

(56) References Cited

U.S. PATENT DOCUMENTS 3,965,687 A * 6/1976 Shaw ........................ E02D 7/24
                                                        37/318
4,069,681 A * 1/1978 Mott ...................... E02B 17/027
                                                        405/208
(Continued)

FOREIGN PATENT DOCUMENTS

CN     1730842     2/2006
GB     2028403 A   3/1980
(Continued)

OTHER PUBLICATIONS

International Preliminary Report on Patentability for International (PCT) Patent Application No. PCT/DK2013/050034, dated Aug. 12, 2014, 6 pages.
(Continued)

*Primary Examiner* — Frederick L Lagman
(74) *Attorney, Agent, or Firm* — Berg Hill Greenleaf Ruscitti, LLP.

(57) ABSTRACT

The invention relates to a seabed foundation (1) for an offshore facility, comprising a primary pressure chamber (7) connected to a primary pump (8) and one or more secondary pressure chambers (9) connected to one or more secondary pumps (10). According to an embodiment of the invention, said primary pump is a suction pump and said secondary pump is a pressure pump. The invention further relates to a method (12) of installing said foundation on the seabed (19), which comprises the steps of activating (14) said primary pump to create negative pressure in the primary pressure chamber (7), so that the foundation sinks into the seabed, (Continued)

and activating (15) said one or more secondary pumps (10) to create positive pressures in the secondary pressure chambers (9), so as to control the alignment of the foundation with respect to a substantially horizontal axis (16) during the sinking into the seabed.

4 Claims, 6 Drawing Sheets

(51) Int. Cl.
*B63B 21/27* (2006.01)
*E02D 27/42* (2006.01)
*E02D 23/00* (2006.01)
*E02D 27/10* (2006.01)
*E02D 27/22* (2006.01)
*E02D 27/32* (2006.01)
*E02D 27/50* (2006.01)
*E02D 29/09* (2006.01)
*F03D 13/20* (2016.01)
*E02B 17/00* (2006.01)
*B63B 21/26* (2006.01)

(52) U.S. Cl.
CPC .............. *E02D 27/22* (2013.01); *E02D 27/32* (2013.01); *E02D 27/42* (2013.01); *E02D 27/50* (2013.01); *E02D 29/06* (2013.01); *F03D 13/22* (2016.05); *B63B 2021/267* (2013.01); *E02B 2017/0078* (2013.01); *F05B 2240/95* (2013.01); *Y02E 10/727* (2013.01)

(58) Field of Classification Search
USPC .............................................. 405/224.1, 226
See application file for complete search history.

(56) References Cited

U.S. PATENT DOCUMENTS

| | | | | |
|---|---|---|---|---|
| 4,086,866 A * | 5/1978 | Nixon | .................... | B63B 21/26 114/295 |
| 4,189,255 A * | 2/1980 | Macan | .................... | E02D 29/06 405/195.1 |
| 4,304,506 A | 8/1981 | Olsen et al. | | |
| 4,432,671 A * | 2/1984 | Westra | .................... | B63B 21/27 114/296 |
| 4,558,744 A * | 12/1985 | Gibb | .................... | E21B 33/037 166/222 |
| 4,674,919 A | 6/1987 | Olsen et al. | | |
| 4,761,096 A * | 8/1988 | Lin | .................... | E02B 17/00 405/224.1 |
| 6,203,248 B1 * | 3/2001 | Childers | .................... | E02B 17/02 114/296 |
| 6,371,695 B1 * | 4/2002 | Davenport, III | .................... | E02B 17/00 405/203 |
| 7,407,342 B2 * | 8/2008 | Seidel | .................... | E02B 17/00 405/224 |
| 7,891,910 B2 * | 2/2011 | Schakenda | .................... | E02D 27/52 405/224.1 |
| 8,025,463 B2 * | 9/2011 | Foo | .................... | B63B 21/27 405/224 |
| 8,757,932 B2 * | 6/2014 | Beck | .................... | E02D 27/50 166/341 |
| 2009/0191004 A1 * | 7/2009 | Schakenda | .................... | E02D 27/52 405/232 |

FOREIGN PATENT DOCUMENTS

| | | |
|---|---|---|
| JP | H11-158886 | 6/1999 |
| JP | 2000-110179 | 4/2000 |
| JP | 2004-339695 | 12/2004 |
| WO | WO 0171105 A1 | 9/2001 |

OTHER PUBLICATIONS

International Search Report prepared by the Danish Patent and Trademark Office dated Dec. 18, 2013, for International Application No. PCT/DK2013/050034.

Danish Search Report prepared by the Danish Patent and Trademark Office dated Sep. 21, 2012, for Danish Application No. PA 2012 70068.

* cited by examiner

METHOD OF INSTALLING A FOUNDATION IN THE SEA BED AND SUCH FOUNDATION

CROSS REFERENCE TO RELATED APPLICATIONS

This application is a national stage application under 35 U.S.C. 371 and claims the benefit of PCT Application No. PCT/DK2013/050034 having an international filing date of Feb. 8, 2013, which designated the United States, which PCT application claimed the benefit of Danish Patent Application No. PA 2012 70068 filed Feb. 10, 2012, the disclosure of both the above-identified applications are incorporated herein by reference.

FIELD OF THE INVENTION

The invention is related to foundations and more specifically sea-bed foundations for offshore facilities.

BACKGROUND OF THE INVENTION

WO 0171105 discloses a foundation comprising an inner chamber and several outer chambers. The installation of the foundation in the sea-bed is achieved by means of creating an under-pressure in the inner and outer chambers, which creates a pressure difference between the outer chambers, the outside water and the inner chamber, creating a driving force which sucks the skirt of the foundation into the sea bed. In particular, the tuning of the suction pressure in the different outer chambers makes it possible to control the alignment of the foundation with respect to the sea bed during the installation process. A drawback of controlling the correct placement of the foundation in the sea-bed by suction is that when using suction and especially rapid or substantial suction may cause the seabed immediately adjacent the foundation to collapse due to the pressure differential between the chamber in which the under-pressure is increased and the surrounding bottom, thereby creating an open connection fluidizing the bottom material in this section. In this situation it is impossible to continue suction and thereby further placement of the foundation or control of the setting procedure. Hence, there is a need of a safer and faster process of installing a foundation in the sea bed.

SUMMARY OF THE INVENTION

The object of the invention is to overcome the above-mentioned drawbacks of the prior art by means of a method of installing a foundation in the sea bed and a foundation, for this use.

In order to address this problem the present invention provides a sea bed foundation having a circumferential side wall substantially defining a cylinder, which cylinder is closed in one end and provided with an opening in the opposite end, wherein said sea bed foundation is hollow, downwardly open and which side wall comprises a wall construction defining a skirt and a primary pressure chamber therein, said primary pressure chamber being connected to a primary pump, and wherein said sea bed foundation further comprises one or more secondary pressure chambers connected to one or more secondary pumps.

Contrary to prior art, which only makes use of negative pressure for the installation process (positive pressure is instead used for extraction of the foundation from the sea bed), the invention employs the (simultaneous or alternate) use of negative pressure in the primary chamber (preferably by means of water suction) and the use of one or more positive pressures in the one or more secondary chambers (preferably by means of water injection), so as to control the alignment of the foundation with respect to the sea bed during the installation process.

An advantage of this type of control is that means such as pumps, pipes and control devices are all already present on site. Furthermore, the combined use of water suction for sinking the foundation into the sea bed and pressurized water for adjusting/correcting the placing of the foundation permits to achieve a safer and faster process. Indeed, the primary pump and the secondary pumps may be used at the beginning of the installation process as suctions pumps so as to sink the foundation faster. In case a misalignment due to inhomogeneous layers of soil in the sea bed occurs, for example, said secondary pumps (some or all of them) may be used to realign the foundation.

According to an embodiment of the invention, said positive pressures (or negative pressures or combinations thereof) are applied in the one or more secondary pressure chambers with different intensities by the one or more secondary pumps. An advantage of this embodiment is that a constant monitoring of the installation process with a consequent more precise placement of the foundation is achieved.

Another advantage of the invention is that the various embodiments of the sea bed foundation may offer several choices with respect to the construction method, the weight and the dimensions of the foundation. Moreover, the volume of the pressure tight chamber formed in the primary chamber when the foundation is placed on the seabed may vary.

According to a further embodiment of the invention said one or more secondary pressure chambers are externally or internally attached to the skirt and, preferably, evenly distributed along the skirt.

According to another embodiment of the invention said one or more secondary pressure chambers are integrated in the skirt and, preferably, divide the skirt in evenly distributed sections.

According to yet another embodiment of the invention said skirt is formed by a number of substantially curved interconnected profiles said number of substantially curved interconnected profiles being provided with one or more secondary pressure chambers, wherein said one or more secondary pressure chambers are, preferably, evenly distributed along the skirt.

Yet another advantage of the different embodiments of the sea bed foundation according to the invention is that said secondary pressure chambers when evenly distributed along the skirt or when dividing the skirt in evenly distributed sections permit a more homogeneous control.

According to yet another embodiment of the invention said primary pump is a suction pump, and said secondary pump is a pressure pump.

According to yet another embodiment of the invention said primary pump is a pressure pump, and said secondary pump is a suction pump.

The use of dedicated pumps having been specially designed to either suction or pressure assures better control during operation, whereas combined pressure/suction pumps tend to be more efficient for either suction or pressure. Therefore by using different pumps more control and improved efficiency is achieved.

According to yet another embodiment of the invention said secondary pumps are a combination of suction pumps and/or pressure pumps.

The invention is also directed to a method for establishing a sea bed foundation for an offshore facility, comprising a sea bed foundation according to any of the previous embodiments, wherein said method comprises the steps of:
- positioning a sea bed foundation according to any of the previous embodiments on the sea-bed;
- activating said primary pump to create negative pressure in the primary pressure chamber, so that the foundation sinks into the sea bed;
- activating said one or more secondary pumps to create positive pressure in the secondary pressure chambers, so as to control the alignment of the foundation with respect to a substantially vertical axis during the sinking into the sea bed;
- deactivating said primary pump and said secondary pumps when the foundation has reached a desired level in the sea bed;

DESCRIPTION OF THE DRAWINGS

FIG. 3B—A sea bed foundation according to the invention, where secondary pressure chambers internally attached to the skirt are shown.

DETAILED DESCRIPTION OF THE INVENTION

Figure 1:
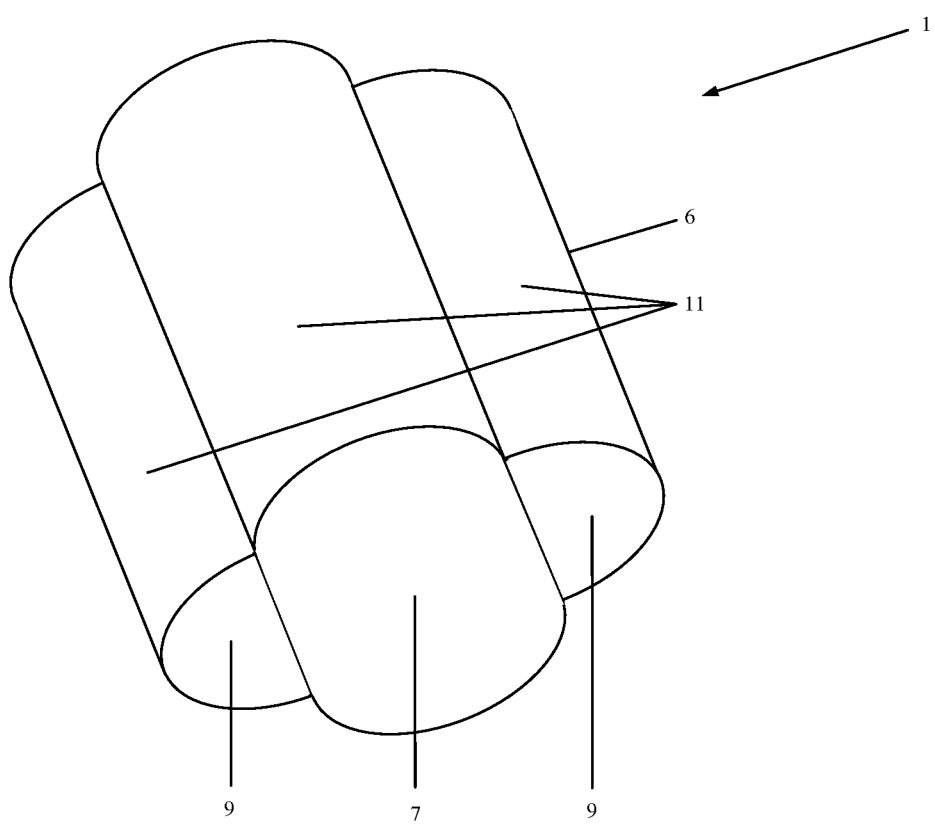
FIG. 1—A sea bed foundation according to the invention, where a number of substantially curved interconnected profiles is shown.

The invention will be described with respect to the figures. FIG. 1 shows a sea bed foundation 1 having a circumferential side wall (skirt) substantially defining a cylinder, which is closed in one end and provided with an opening in the opposite end.

In this application "sea bed" refers to waterbottom in general (e.g., sea, lake, etc.), and "cylinder" refers to a surface created by projecting a closed two-dimensional curve along an axis, which perpendicularly intersects the plane of said curve. Hence, a cylinder according to this definition may for example have circular, elliptical or polygonal cross-sections.

Said sea bed foundation 1 is hollow and downwardly open, and its side wall comprises a wall construction defining a skirt 6 and a primary pressure chamber 7 therein. The primary pressure chamber is connected to a primary pump 8 (FIG. 2) such as a suction pump. The foundation further comprise one or more secondary pressure chambers 9, in this example two secondary pressure chambers, connected to one or more secondary pumps 10 (FIG. 2) such as pressure pumps.

FIG. 1 shows that the skirt 6 may be formed by a number of substantially curved interconnected profiles 11 provided with one or more secondary pressure chambers 9. The one or more secondary pressure chambers may preferably be evenly distributed along the skirt.

Figure 2:
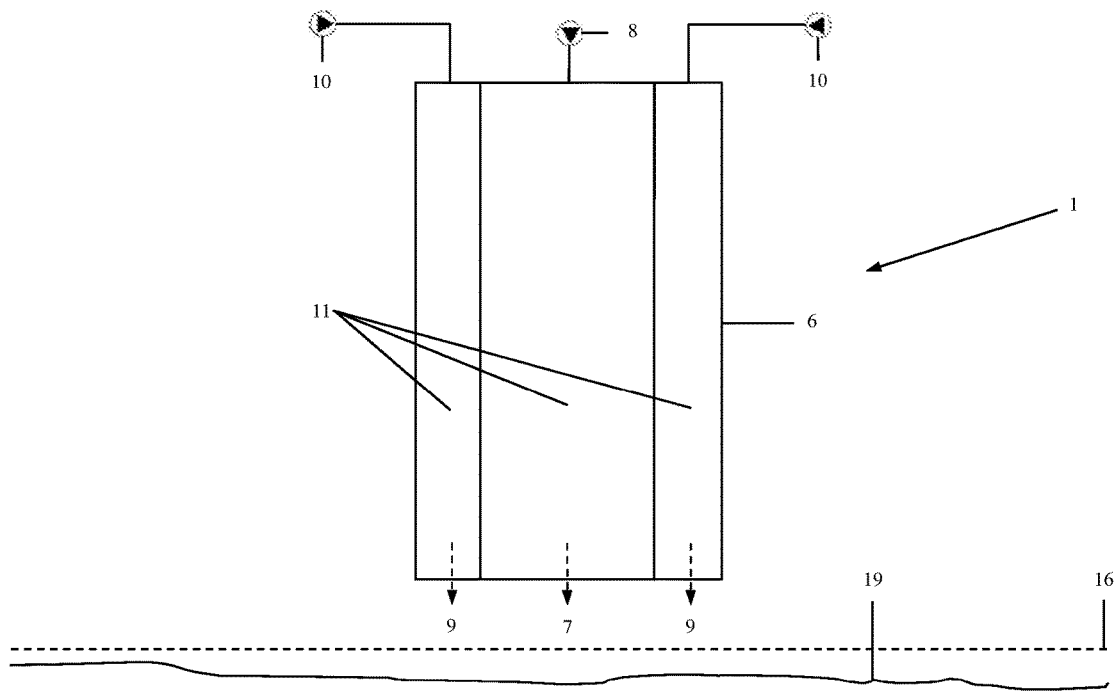
FIG. 2—A sea bed foundation according to the invention, where a primary pump and secondary pumps are shown.

In FIG. 2 is illustrated a foundation 1 hovering above a sea bottom 19. The dashed line 16 indicates a substantially horizontal plane, where it is desirable to erect the foundation substantially vertically, i.e. perpendicularly to this plane 16 and not the sea bottom 19. The pressure chambers 7,9 are open downwards (indicated by dashed arrows). As the lower rim of the skirt 6 is buried into the sea bottom, the pressure chambers 7,9 are entirely closed—by the foundation structure and the bottom. By creating under pressure in the chambers 7,9 by evacuating the water in the chambers, the foundation structure will sink into the bottom 19. As the foundation 1 sinks into the bottom 19 it may/will encounter various bottom layers, which layers will create more or less resistance against the penetration, thereby causing the foundation structure 1 to come out of perfect alignment. In order to rectify this mis-alignment and make sure that the foundation 1 is placed substantially perfectly vertical, overpressure is established in the chambers 9 by means of the pump 8. Preferably three chambers are provided such that complete three-axis control is established. The over-pressure created by the pumps 10 will increase the resistance against penetration adjacent the chamber 9, allowing the rest of the foundation to penetrate the bottom at the normal resistance, thereby rectifying the orientation of the foundation.

The embodiments described in order to illustrate the invention are overly simplified in comparison to the real installations. In "real life" a substantial number of pumps, sensors, sometimes vibrators etc are installed in/on the foundation in order to aid installation, but for the purpose of illustrating the invention only the necessary components are described.

Figure 3A:
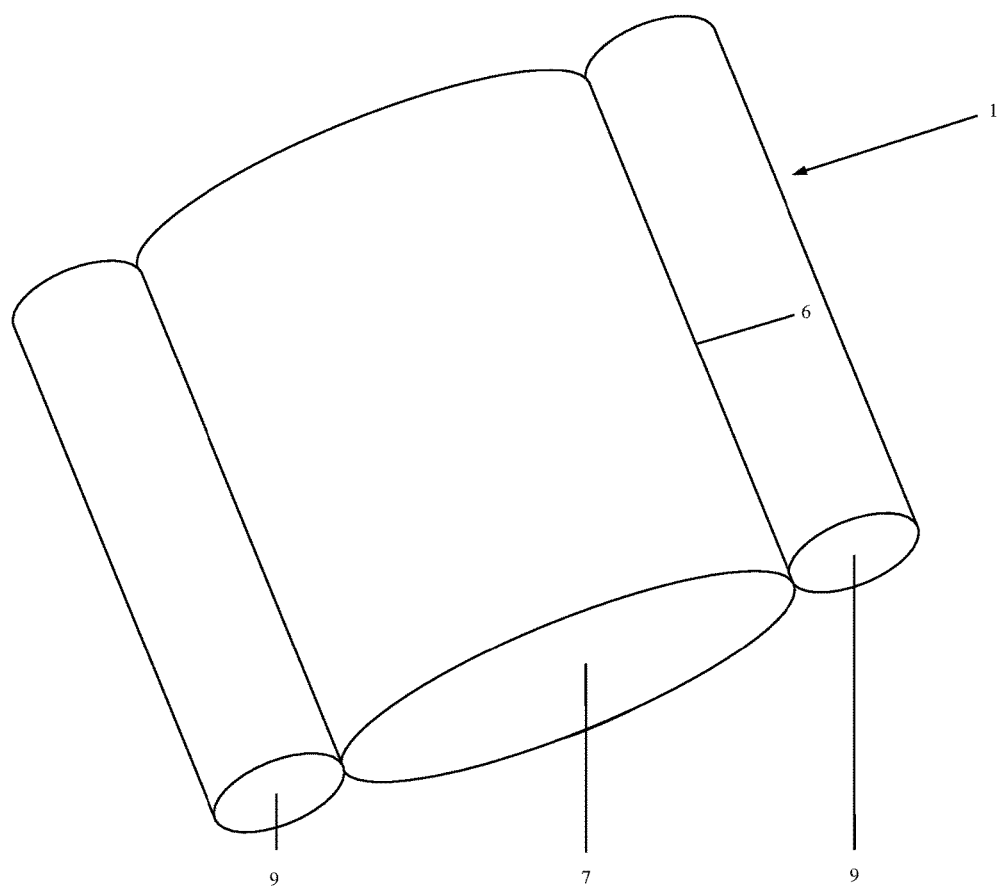
FIG. 3A—A sea bed foundation according to the invention, where secondary pressure chambers externally attached to the skirt are shown.
Figure 3B:
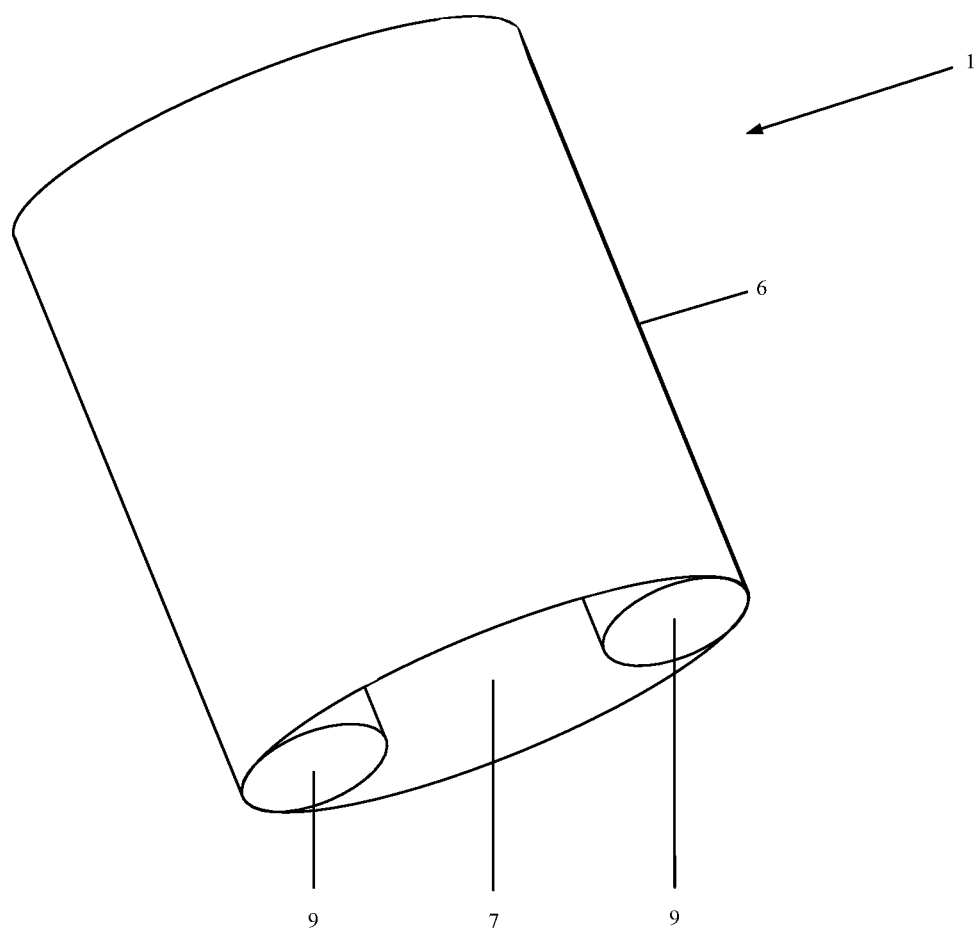

FIG. 3A-B show two embodiments of the invention, where the secondary pressure chambers 9 are arranged externally or internally with respect to the skirt 6.

Figure 4:
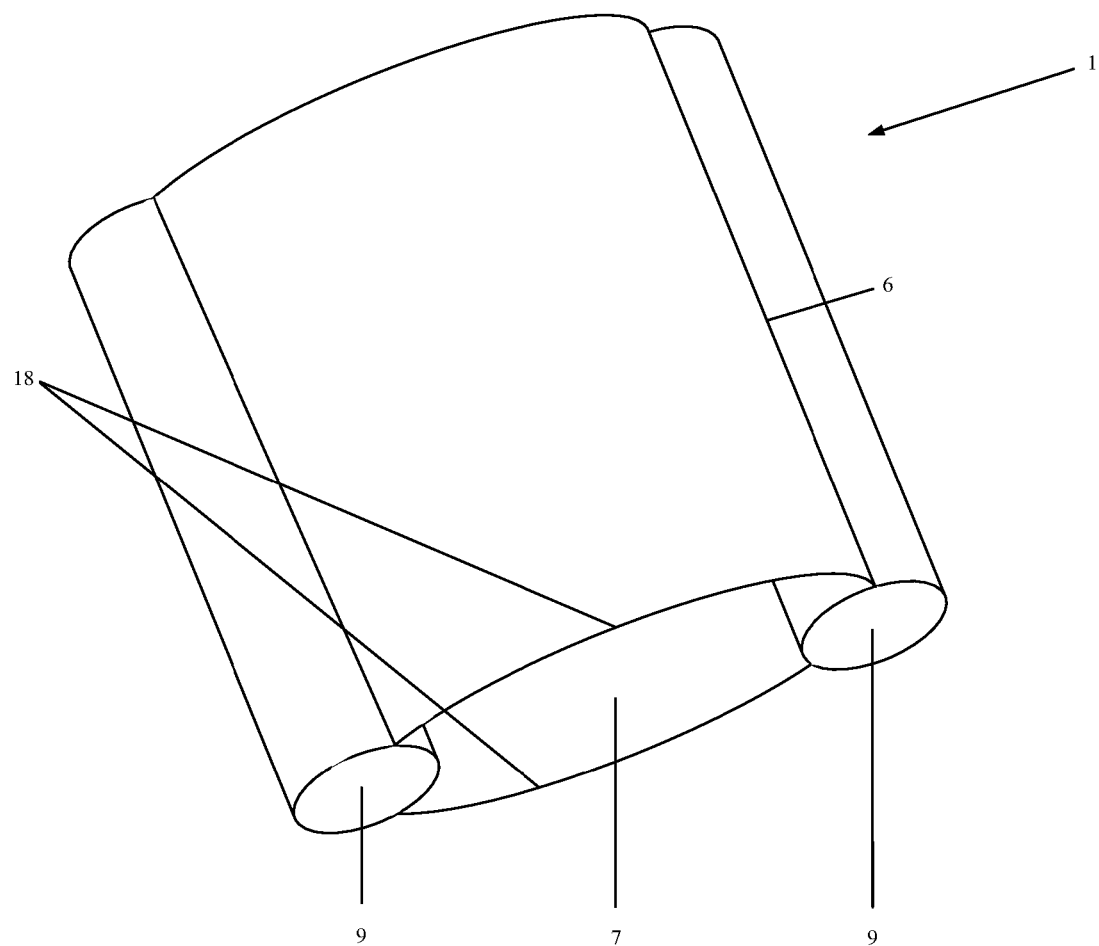
FIG. 4—A sea bed foundation according to the invention, where secondary pressure chambers integrated in the skirt are shown.

FIG. 4 shows an embodiment of the invention, where the secondary pressure chambers 9 are integrated in the skirt 6 and divide the skirt in evenly distributed sections 18.

FIG. 1-4 shows two secondary pressure chambers 9 for explicative reasons only. Hence, no limitation regarding the number of secondary pressure chambers has to be drawn from the figures. Foundations including three, four or more secondary pressure chambers 9 are also contemplated within the scope of the invention.

Figure 5:
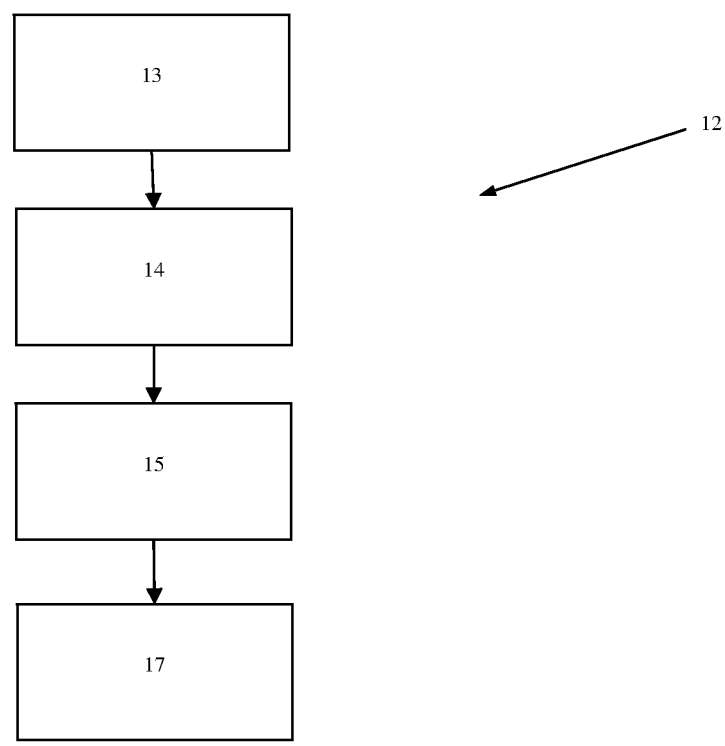
FIG. 5—Schematic illustration of a method for establishing a sea bed foundation according to the invention.

FIG. 5 shows a schematic illustration of a method 12 for establishing a sea bed foundation 1 for an offshore facility. Said method comprises a sea bed foundation 1 according to any of the previous embodiments of the invention. The method comprises the steps of:
- Positioning 13 a sea bed foundation according to any of the previous embodiments on the sea-bed 19.
- Activating 14 said primary pump 8 to create negative pressure in the primary pressure chamber 7, so that the foundation sinks into the sea bed 19.
- Activating 15 said one or more secondary pumps 10 as necessary to create positive pressures in the secondary pressure chambers 9, so as to control the alignment of the foundation with respect to a substantially horizontal plane 16 during the sinking of the foundation 1 into the sea bed 19.
- Deactivating 17 said primary pump and said secondary pumps when the foundation has reached a desired level in the sea bed.

Said positive pressures (or negative pressures or combinations thereof) may be applied in the one or more secondary pressure chambers 9 with different intensities by the one or more secondary pumps 10.

It should be noted, see FIG. 2 that very often the sea bottom 19 is not even or provides a smooth surface. The sea-bottom may be prepared prior to installing the foundation, for example by removing the top sediment layers. Furthermore the bottom into which the foundation is to penetrate is typically made up of different types of soil such as sand, silt and/or clay and others. This naturally imposes special requirements to the control procedure of setting the foundation and the sinking action carried out by the pumps. The suction in the main suction chamber will have no effect until the lower rim of the skirt 6 has penetrated a certain distance into the sea bottom 19. This initial penetration/sinking of the skirt may be obtained by the foundation structures' own weight. Alternatively the initial sinking may be helped by mechanical means. It is important to assure that the pressure chambers are substantially closed before pressure both under and over pressure is established, as otherwise pressure will only fluidize the surrounding bottom with no or detrimental effect to the setting of the foundation.

The invention claimed is:

1. A sea bed foundation for an offshore facility, said sea bed foundation having a circumferential side wall substantially defining a cylinder, which cylinder is closed in one end and provided with an opening in the opposite end, thereby defining a primary chamber, said sea bed foundation is hollow, downwardly open and where said side wall defines a skirt, said primary chamber being connected to a primary pump, and wherein said sea bed foundation further comprises one or more secondary chambers, said secondary chambers being separate from the primary chamber, and being downwardly open, but otherwise closed by the sea bed foundation, where said one or more secondary chambers are connected to one or more secondary pumps wherein said primary pump is a suction pump and said secondary pump is a pressure pump, and where an over-pressure created by the one or more secondary pumps increases a resistance against penetration adjacent the one or more secondary chambers, allowing a rest of the foundation to penetrate a bottom at a normal resistance, thereby rectifying an orientation of the foundation.

2. The sea bed foundation according to claim 1, wherein said one or more secondary chambers are externally attached to the skirt.

3. The sea bed foundation according to claim 1, wherein said one or more secondary chambers are integrated in the skirt.

4. The sea bed foundation according to claim 1, wherein said skirt is formed by a number of substantially curved interconnected profiles, said number of substantially curved interconnected profiles being provided with one or more secondary chambers.

* * * * *